United States Patent

[11] 3,589,746

| [72] | Inventors | Leslie R. Inglis;<br>Howard N. Bollinger, both of Cincinnati, Ohio |
|---|---|---|
| [21] | Appl. No. | 867,026 |
| [22] | Filed | Oct. 16, 1969 |
| [45] | Patented | June 29, 1971 |
| [73] | Assignee | American Hospital Supply Corporation<br>Evanston, Ill. |

[54] WIRE SHELF CART
11 Claims, 8 Drawing Figs.

[52] U.S. Cl. .................................................. 280/79.3,
108/111, 211/148, 248/250
[51] Int. Cl. ............................................................ B62b 5/00
[50] Field of Search .......................................... 280/79.3;
248/250; 211/148; 108/111

[56] References Cited
UNITED STATES PATENTS

| 2,385,559 | 9/1945 | Wenthe | 280/79.3 |
| 3,007,708 | 11/1961 | Ochs | 280/79.3 X |
| 3,330,576 | 7/1967 | Willis | 280/79.3 |

*Primary Examiner*—Kenneth H. Betts
*Assistant Examiner*—Winston H. Douglas
*Attorney*—Dawson, Tilton, Fallon & Lungmus ABSTRACT: A wire shelf cart equipped with casters and having a plurality of horizontal wire shelves joined at opposite ends by upstanding wire frames, the shelves and end frames defining channels or recesses in which L-shaped mounting clips are received for rigidly interlocking such frames and shelves.

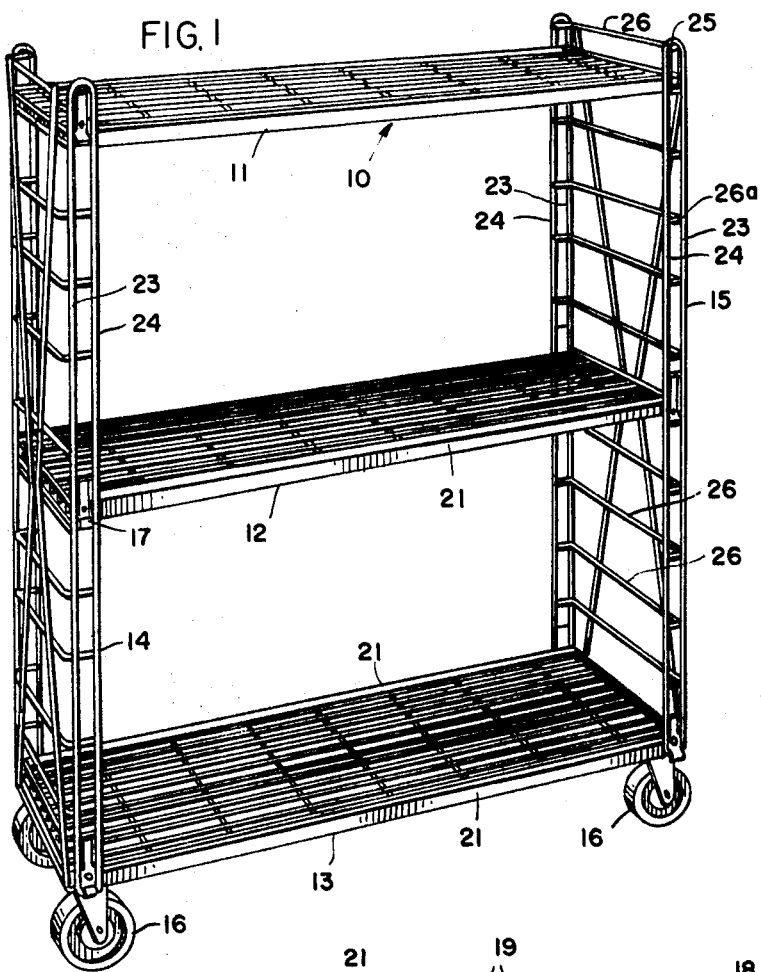
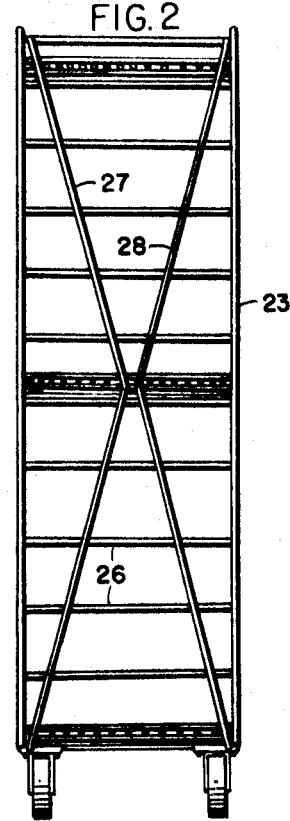
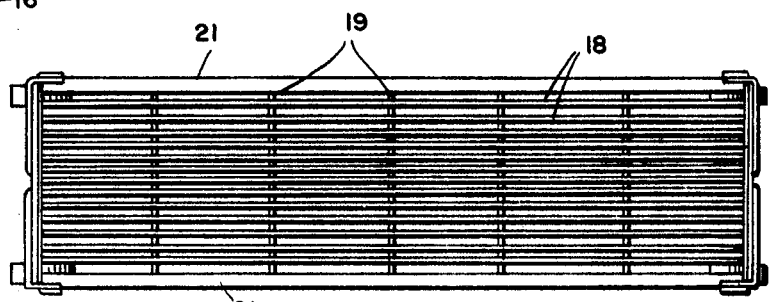
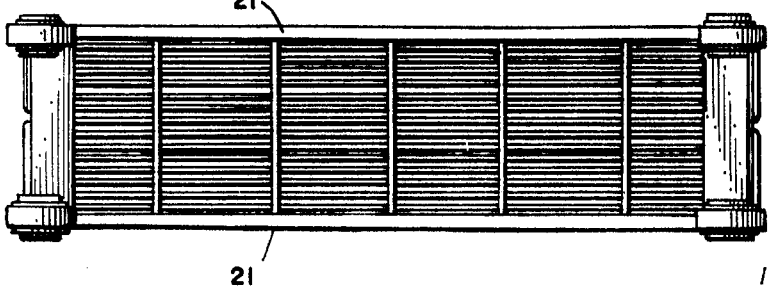

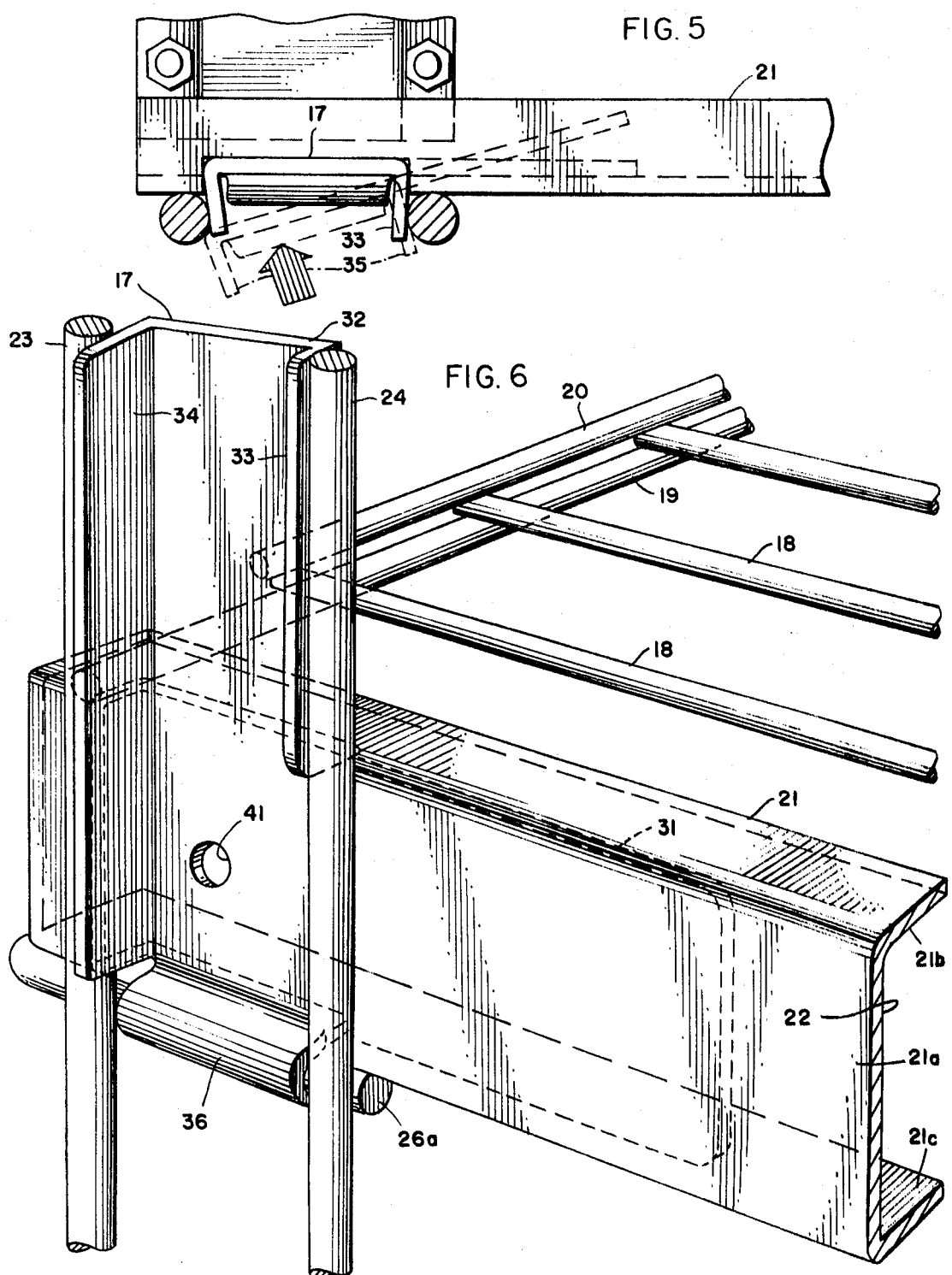

PATENTED JUN29 1971
3,589,746
SHEET 3 OF 3
FIG. 7
FIG. 8
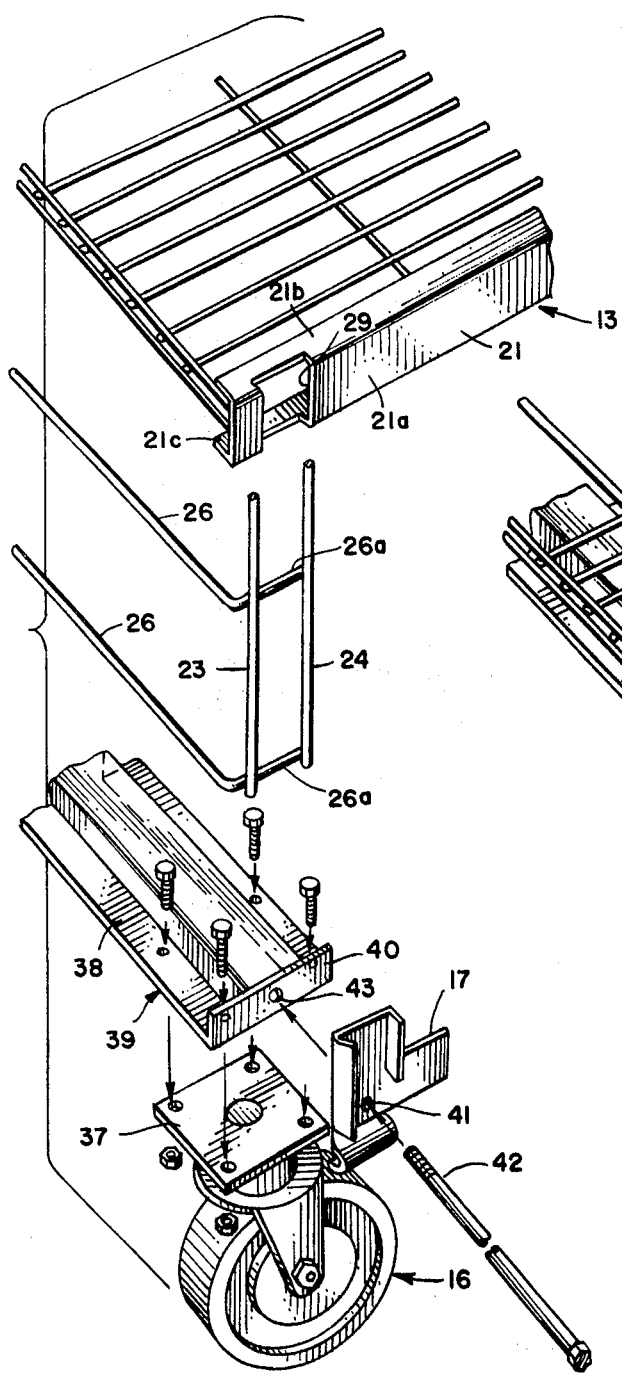
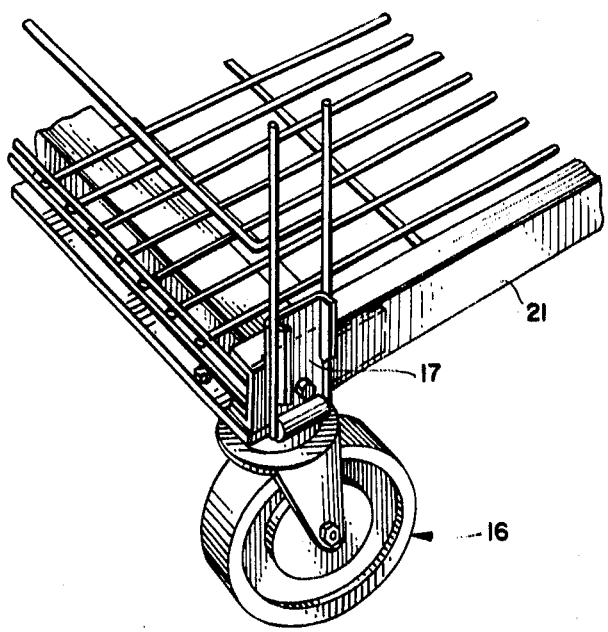
INVENTORS:
LESLIE R. INGLIS
HOWARD N. BOLLINGER
Dawson, Tilton, Falloy, & Lungmus
ATT'YS

WIRE SHELF CART

BACKGROUND

Wire shelf carts are relatively light in weight compared with carts having solid metal shelves and panels and have a number of other advantages which make them particularly suitable for use in hospitals and other institutions. In an effort to achieve rigidity, conventional wire shelf carts are usually equipped with special reinforced base sections to which the cart's end frames as well as its casters are connected. Even with such special base sections adequate rigidity is seldom obtained or maintained, especially after extended periods of use. The problems of developing adequate rigidity and strength in wire carts are particularly troublesome because of the racking forces commonly applied to such carts—that is, the horizontal forces exerted against the ends of such carts as they are pushed or pulled and which tend to urge the end frames out of perpendicular relation to the shelves.

SUMMARY

An important aspect of the invention lies in a highly effective interconnection between the shelves and upstanding end frames of a wire cart, such interconnection being capable of resisting the racking forces to which the cart would be normally subjected over extended periods of time. A further object lies in providing a shelf cart which is surprisingly rigid and strong in view of the wire construction of its shelves, end frames, and base.

A still further object is to provide a wire shelf cart in which the shelves may be connected to the end frames in any of a variety of selected positions and in which the number of shelves may be varied to suit the particular needs of the user. Yet another object is to provide such a cart in which the interconnection between the shelves and the end frames provide such a high degree of rigidity that no special base construction is required and, in fact, one of the standard shelves of the cart may be used to form such base.

Briefly, the cart is provided with a plurality of wire shelves, each shelf having channel-shaped side members with their channels facing inwardly towards each other. A pair of upstanding wire end frames are provided with wire elements which engage the outer side surfaces of the shelf members adjacent the ends thereof, the pairs of such vertical wire elements being connected at spaced intervals by relatively short horizontal wire elements. The end frames and shelves are connected together by L-shaped clips which extend through openings adjacent the ends of the side frame members of the shelves, each clip having a horizontal leg portion which is snugly received in the channel of such member and having a vertical leg which is tightly received between a pair of vertical wire elements of an end frame. The clip is also provided with a hook portion which receives one of the horizontal wire elements of the end frame to hold the shelf at a selected elevation. The bottom shelf forms the base of the cart and is connected to the end frames in the same manner described; however, additional means are affixed to such bottom shelf to support the caster assemblies.

DRAWINGS

FIG. 1 is a perspective view of a wire shelf cart embodying the present invention;

FIG. 2 is an end elevational view of the cart;

FIG. 3 is a top plan view;

FIG. 4 is a bottom view;

FIG. 5 is an enlarged fragmentary horizontal sectional view illustrating the cooperative relationship between the shelf channel, end frame, and clip of the cart;

FIG. 6 is a fragmentary perspective view illustrating the structural relationship between the shelf channel, end frame, and clip;

FIG. 7 is an exploded perspective view, and FIG. 8 is an assembled perspective view, illustrating the relationship between a caster, a clip, end frame, and the cart's lower shelf.

DESCRIPTION

The wire cart illustrated in its entirety in FIGS. 1—4 is designated generally by the numeral 10 and consists essentially of a plurality of shelves 11, 12 and 13, and a pair of upstanding end frames 14 and 15. The lowermost shelf 13 constitutes the base section of the cart and is equipped with caster assemblies 16. As shown in the drawings, shelves 11—13 and end frames 14—15 are formed substantially entirely of wire and are connected together by clips 17.

While three shelves are shown in the drawings, it will be understood that a greater (or smaller) number might be provided, depending on the intended use of the cart. The shelves are substantially identical in construction, each shelf being of generally rectangular shape and having spaced longitudinally extending wires 18 secured together at spaced intervals by transversely extending wires 19. The transverse wires 19 extend beneath the longitudinally extending wires except at the ends of the shelves where additional overlying transverse wires 20 may be provided for reinforcement (FIG. 6).

Each shelf is provided along opposite longitudinal sides with channel-shaped side members 21. Viewed in vertical section, each side member is C-shaped in configuration with a vertical wall portion 21a and upper and lower horizontal wall portions 21b and 21c formed integrally therewith. The side members are arranged so that the channels 22 defined thereby face inwardly; that is, the channels of the two side members of each shelf face towards each other.

In the embodiment illustrated, the end frames 14 and 15 are identical in construction and are formed entirely of wire. Each end frame includes a pair of closely spaced vertical wire elements 23 and 24, elements 23 defining the vertically extending corners of the cart and elements 24 lying in vertical planes extending along the sides of the cart. If desired, elements 23 and 24 at each corner of the upstanding end frames may be formed integrally from a single reversely turned piece of wire as shown most clearly in FIG. 3 where it will be observed that the upper ends of such members are bridged by integral connecting portions 25.

Horizontal wire elements 26 extend between the two sets of vertical elements 23—24 of each end frame. Such horizontal elements are arranged in vertically spaced series and each horizontal element has a lateral portion 26a which is welded or otherwise rigidly secured to the paired vertical elements 23—24 at the sides of each end frame. In addition, each end frame is provided with reinforcing wire elements 27 and 28, each of such reinforcing elements being secured to the uppermost horizontal wire element at a corner of an end frame, then angling downwardly and inwardly to an intermediate or central point, and finally extending downwardly and outwardly to a lower corner of the frame.

Referring to FIGS. 5, 6 and 7, it will be seen that the channel members 21 of the shelves are provided with rectangular openings 29 adjacent the ends thereof. Each of the openings extends through vertical wall portion 21a and projects a limited distance into upper and lower horizontal wall portions 21b and 21c (FIG. 7). The width of each channel opening 29 corresponds to the distance between vertical wire elements 23 and 24 of the end frames. Referring to FIG. 6, an L-shaped mounting clip 17 is disposed at the corners of each shelf and securely connects the shelf to the vertical and horizontal wire elements 23, 24 and 26a of the end frames. Each L-shaped clip extends through a channel opening 29 and has a horizontal leg portion 31 of substantial length (preferably more than 2 inches) which is snugly received in channel 22. The clip also has an upstanding or vertical leg portion 32 which projects upwardly a substantial distance (also preferably more than 2 inches) between vertical wire elements 23 and 24. The upstanding leg portion 32 is provided with outwardly or laterally projecting ears 33 and 34 which bear tightly against opposing surface portions of elements 23 and 24 to maintain the clip securely in place. As illustrated in FIG. 5, a tight locking interfit may be achieved by providing the vertical leg portion of the clip with a width slightly greater than the distance between wire elements 23 and 24 so that substantial driving force must be applied in the direction of arrow 35 (by means of a hammer or other suitable tool) to cause the wire elements to spring slightly apart until the clip is in fully seated position. Once in position, the clip is deformed slightly by the inward force exerted upon its ears 33 and 34 and is held firmly in position.

Vertical sliding movement of the clip between wire elements 23 and 24 is prevented not only by the tight frictional engagement between such elements and ear portions 33 and 34 but also by means of a hook portion 36 formed integrally with the clip and projecting downwardly therefrom. Hook portion 36 receives one of the horizontal wire elements 26a of an end frame when the clip is in its locking position (FIG. 6). The result is a rigid interlock between the shelves and the end frames and, in particular, an interlock which is especially effective in resisting racking forces exerted upon the cart as it is moved about. Furthermore, such forces are effectively resisted even though the base structure of the cart comprises a bottom shelf 13 which, except for the caster assemblies, is identical to the other shelves of the cart. It is believed apparent that the locking relation between hook portion 36 and horizontal wire element 26a is particularly important for the lowermost shelf since that shelf, as part of the base structure for the cart, must support the weight of the entire upper portion of the cart and all items stored thereon. Thus, hooks 36 serve an especially useful function in preventing relative sliding movement between the bottom shelf and the end frames in response to such weight.

FIGS. 7 and 8 illustrate how the caster assemblies 16 are mounted on the lower shelf 13. The mounting plates 37 of the casters are bolted directly to the horizontal flanges 38 of transverse mounting members 39, such mounting members extending between channel openings 29 at each end of the lower shelf 13 and being equipped at their ends with vertical end plates 40. Each rectangular end plate is dimensioned to be tightly or intimately received within a shelf channel 22 and such closeness of fit, combined with the substantial horizontal length of each end plate, prevents rocking of the caster mounting member 39 within channel 22 when the parts are assembled. Each clip 17 is provided with an opening 41 through which bolt 42 extends, the bolt passing through the clip and through opening 43 in the adjacent end of the mounting member to rigidly secure each mounting member to the clips 17 of the lower shelf. Preferably each bolt 42 is in the form of a tie bolt (as shown in FIG. 7)—that is, an elongated transverse bolt equipped with a nut—so that only one such bolt is required at each end of the cart, each bolt extending completely through one of the transverse mounting members 39 and through a pair of clips 17. Since the clips lock the lower shelf to the end frames and are themselves securely locked in position, an extremely rigid assembly is achieved. Furthermore, since a substantial portion of each clip 17 for the base structure is sandwiched between an end plate 40 of one of the transverse mounting members 39 and the inside surface of a shelf channel member 21, there is no possibility that any clip of the base structure might twist or rotate out of position.

While in the foregoing we have disclosed an embodiment of the invention in considerable detail for purposes of illustration, it will be understood by those skilled in the art that many of these details may be varied without departing from the spirit and scope of the invention.

We claim:

1. A cart having a plurality of horizontal shelves and a pair of vertical end frames, each of said shelves having a pair of parallel side channel members defining inwardly facing horizontal channels and having openings extending horizontally through said members adjacent the ends thereof, said end frames having upstanding frame portions disposed laterally outwardly of said channel members, each frame portion on each side of said shelves having vertical elements and horizontal elements defining apertures communicating with said openings of said channel members, and L-shaped mounting clips rigidly interconnecting said shelves and said end frames, each clip extending through said opening and said aperture and having a horizontal leg received in said horizontal channel, each clip also having a vertical leg disposed in one of said apertures between said vertical elements and tightly engaging said vertical elements to hold said end frames and shelves at right angles to each other.

2. The structure of claim 1 in which each clip is provided with means engaging one of said vertical elements for locking said shelves at said selected vertical positions relative to said end frames.

3. The structure of claim 1 in which said vertical leg of each said clip is provided with a pair of outwardly projecting ear portions, said ear portions being in tight frictional engagement with said vertical elements.

4. The structure of claim 1 in which the lowermost of said plurality of shelves comprises the base portion of said cart, and caster assemblies secured to said lowermost shelf and to the L-shaped clips for said lowermost shelf.

5. The structure of claim 1 in which said vertical elements of said end frames are formed of wire.

6. The structure of claim 5 in which said horizontal elements of said end frames are formed of wire.

7. The structure of claim 6 in which means are provided by said clip and said frame member for locking said clip against vertical sliding movement along said vertical elements.

8. The structure of claim 7 in which said means comprises a horizontal frame member secured to said vertical elements, and a hook portion provided by said clip and engaging said horizontal element.

9. The structure of claim 8 in which said vertical and horizontal elements are formed of wire.

10. In combination, a shelf having a horizontal side member of generally C-shaped cross section having a vertical wall portion and upper and lower horizontal wall portions formed integrally therewith and defining a horizontal channel, an upstanding frame member engaging the surface of said vertical wall portion opposite from said channel, said frame member including a pair of spaced and rigidly interconnected vertical elements, said vertical wall portion of said side member having an opening communicating with the space between said vertical elements, and an L-shaped mounting clip extending through said opening and rigidly and frictionally securing said shelf and frame member together, said clip having a horizontal leg snugly received in said channel and having a vertical leg tightly received between said vertical elements.

11. The structure of claim 10 in which said vertical leg of said clip is provided with a pair of outwardly projecting ear portions formed integrally therewith and disposed between said vertical elements in tight frictional engagement therewith.